US011722400B2

(12) United States Patent
Sivabalan et al.

(10) Patent No.: US 11,722,400 B2
(45) Date of Patent: Aug. 8, 2023

(54) CENTRALIZED APPROACH TO SR-TE PATHS WITH BANDWIDTH GUARANTEE USING A SINGLE SID

(71) Applicant: Ciena Corporation, Hanover, MD (US)

(72) Inventors: Muthurajah Sivabalan, Kanata (CA); Sami Boutros, Union City, CA (US); Cengiz Alaettinoglu, Sherman Oaks, CA (US)

(73) Assignee: Ciena Corporation, Hanover, MD (US)

( * ) Notice: Subject to any disclaimer, the term of this patent is extended or adjusted under 35 U.S.C. 154(b) by 73 days.

(21) Appl. No.: 17/521,073

(22) Filed: Nov. 8, 2021

(65) Prior Publication Data

US 2023/0146226 A1 May 11, 2023

(51) Int. Cl.
*H04L 12/66* (2006.01)
*H04L 45/16* (2022.01)
*H04L 45/48* (2022.01)

(52) U.S. Cl.
CPC .............. *H04L 45/16* (2013.01); *H04L 45/48* (2013.01)

(58) Field of Classification Search
CPC ....... H04L 45/16; H04L 45/48; H04L 45/121; H04L 45/125
See application file for complete search history.

(56) References Cited

U.S. PATENT DOCUMENTS

| | | | |
|---|---|---|---|
| 7,120,792 B1 | 10/2006 | Jacobson et al. |
| 7,197,573 B1 | 3/2007 | Jacobson et al. |
| 7,430,176 B2 | 9/2008 | Nalawade et al. |
| 7,539,191 B1 | 5/2009 | Jacobson |
| 7,684,351 B2 | 3/2010 | Vasseur et al. |
| 8,135,834 B1 | 3/2012 | Jacobson et al. |
| 8,274,901 B1 | 9/2012 | Casner et al. |
| 8,422,502 B1 | 4/2013 | Alaettinoglu et al. |
| 8,824,331 B1 | 9/2014 | Maettinoglu et al. |
| 8,937,946 B1 | 1/2015 | Kanna et al. |
| 9,979,629 B2 | 5/2018 | Sivabalan et al. |

(Continued)

FOREIGN PATENT DOCUMENTS

| | | |
|---|---|---|
| EP | 3 038 301 B1 | 3/2020 |
| WO | 2021/0967231 A1 | 4/2021 |

OTHER PUBLICATIONS

Feb. 15, 2023, International Search Report and Written Opinion of the International Application No. PCT/US2022/049101.

*Primary Examiner* — Abdelnabi O Musa
(74) *Attorney, Agent, or Firm* — Baratta Law PLLC; Lawrence A. Baratta, Jr.

(57) ABSTRACT

Systems and methods include determining a Multi-Point to Point (MP2P) tree from a plurality of source nodes to a destination node in a Segment Routing network, wherein the plurality of source nodes are sending traffic with guaranteed bandwidth requirements to the destination node, and wherein the MP2P tree is determined based on the guaranteed bandwidth; assigning a globally unique Segment Identifier (SID) for the MP2P tree; and causing programming of forwarding entries in the plurality of source nodes, any intermediate nodes, and the destination node, based on the MP2P tree. The steps can further include receiving measurements from nodes on the MP2P tree of bandwidth utilized against the globally unique SID; and updating the MP2P tree if required based on the measurements. Each of the plurality of source nodes utilize the globally unique SID to send traffic with guaranteed bandwidth requirements to the destination node.

20 Claims, 3 Drawing Sheets

(56) References Cited

U.S. PATENT DOCUMENTS

| | | | |
|---|---|---|---|
| 10,033,623 B2 | 7/2018 | Jain et al. | |
| 10,158,558 B1 | 12/2018 | Ward et al. | |
| 10,165,093 B2* | 12/2018 | Filsfils | H04L 45/50 |
| 10,171,338 B2 | 1/2019 | Filsfils et al. | |
| 10,250,494 B2 | 4/2019 | Sivabalan et al. | |
| 10,277,558 B2 | 4/2019 | Khan et al. | |
| 10,291,516 B2 | 5/2019 | Bryant et al. | |
| 10,454,821 B2 | 10/2019 | Filsfils et al. | |
| 10,567,295 B2* | 2/2020 | Barton | H04L 43/0852 |
| 10,740,408 B2 | 8/2020 | Ramasamy et al. | |
| 10,833,976 B2 | 11/2020 | Saad et al. | |
| 10,868,755 B2 | 12/2020 | Filsfils et al. | |
| 11,057,278 B1 | 7/2021 | Côté et al. | |
| 2007/0165515 A1* | 7/2007 | Vasseur | H04L 45/502 |
| | | | 370/216 |
| 2015/0271034 A1 | 9/2015 | Kanna et al. | |
| 2016/0057049 A1 | 2/2016 | Jacobson et al. | |
| 2016/0191324 A1 | 6/2016 | Olofsson et al. | |
| 2017/0064717 A1* | 3/2017 | Filsfils | H04L 45/50 |
| 2017/0346720 A1* | 11/2017 | Lazzeri | H04L 45/20 |
| 2018/0324090 A1* | 11/2018 | Duncan | H04L 12/4641 |
| 2019/0297017 A1 | 9/2019 | Pignataro et al. | |
| 2019/0379601 A1 | 12/2019 | Khan et al. | |
| 2020/0112495 A1 | 4/2020 | Attarwala et al. | |
| 2020/0153856 A1 | 5/2020 | Nainar et al. | |
| 2020/0220811 A1 | 7/2020 | Shah | |
| 2021/0029021 A1* | 1/2021 | Torvi | G06F 16/2379 |
| 2021/0092043 A1 | 3/2021 | Filsfils et al. | |
| 2021/0160174 A1 | 5/2021 | Kashyap et al. | |
| 2021/0243095 A1 | 8/2021 | Attarwala et al. | |
| 2022/0006723 A1* | 1/2022 | Debenedetti | H04L 47/283 |
| 2023/0021278 A1* | 1/2023 | Filsfils | H04L 45/28 |

* cited by examiner

STEP 52 DETERMINING A MULTI-POINT TO POINT (MP2P) TREE FROM A PLURALITY OF SOURCE NODES TO A DESTINATION NODE IN A SEGMENT ROUTING NETWORK, WHEREIN THE PLURALITY OF SOURCE NODES ARE SENDING GUARANTEED BANDWIDTH TO THE DESTINATION NODE, AND WHEREIN THE MP2P TREE IS DETERMINED BASED ON THE GUARANTEED BANDWIDTH

STEP 54 ASSIGNING A GLOBALLY UNIQUE SEGMENT IDENTIFIER (SID) FOR THE MP2P TREE

STEP 56 CAUSING PROGRAMMING OF FORWARDING ENTRIES IN THE PLURALITY OF SOURCE NODES, ANY INTERMEDIATE NODES, AND THE DESTINATION NODE, BASED ON THE MP2P TREE

STEP 58 RECEIVING MEASUREMENTS FROM NODES ON THE MP2P TREE OF BANDWIDTH UTILIZED AGAINST THE GLOBALLY UNIQUE SID

STEP 60 UPDATING THE MP2P TREE IF REQUIRED BASED ON THE MEASUREMENTS

*FIG. 2*

CENTRALIZED APPROACH TO SR-TE PATHS WITH BANDWIDTH GUARANTEE USING A SINGLE SID

FIELD OF THE DISCLOSURE

The present disclosure generally relates to networking. More particularly, the present disclosure relates to systems and methods for a centralized approach to Segment Routing-Traffic Engineering (SR-TE) paths with bandwidth guarantee using a single Segment Identifier (SID).

BACKGROUND OF THE DISCLOSURE

Segment Routing-Traffic Engineering (SR-TE) is described, e.g., in Segment Routing Policy Architecture, draft-filsfils-spring-segment-routing-policy-06.txt, May 21, 2018, available at datatracker.ietf.org/doc/html/draft-filsfils-spring-segment-routing-policy, the contents of which are incorporated by reference. Segment Routing (SR) allows a headend node to steer a packet flow along any path. Intermediate per-flow states are eliminated thanks to source routing. The headend node steers a flow into an SR Policy. The header of a packet steered in an SR Policy is augmented with the ordered list of segments associated with that SR Policy.

It is difficult to enforce bandwidth guarantee along with Equal-cost multipath (ECMP)/Unequal-cost multipath (UCMP) for an SR-TE path as ECMP/UCMP is enforced at local nodes. It is possible to pin down Point-to-Point (P2P) SR-TE paths on interfaces (similar to Resource Reservation Protocol-Traffic Engineering (RSVP-TE)) and construct segment lists using only adjacency SIDs in which case SID depth may become larger than the Maximum SID Depth (MSD) limit of the head-end. It is possible to use a unique SID for a P2P path with bandwidth guarantee. However, such approach requires a large label space (O(N^2) where N is the number of edge nodes).

IGP Flexible Algorithm, referred to as SR Flex-Algo, is described in draft-ietf-lsr-flex-algo-17, Jul. 6, 2021, available at datatracker.ietf.org/doc/html/draft-ietf-lsr-flex-algo, the contents of which are incorporated by reference. SR Flex-Algo provides the ability to achieve TE intent (e.g., a low latency path) using a single SID. However, Flex-Algo SIDs are mainly intended for distributed path computation based on Interior Gateway Protocol (IGP) flooding and path computation. Unlike RSVP-TE, distributed path computation with bandwidth constraint is not feasible with SR due to the absence of bandwidth signaling. A Path Computation Element Communication Protocol (PCEP) extension exists to setup, maintain, and delete Point-to-Multipoint (P2MP) forwarding entries.

BRIEF SUMMARY OF THE DISCLOSURE

The present disclosure relates to systems and methods for a centralized approach to Segment Routing-Traffic Engineering (SR-TE) paths with bandwidth guarantee using a single Segment Identifier (SID). The present disclosure provides a centralized SR-TE solution with bandwidth guarantees without Maximum SID Depth (MSD) concerns at the source. For a given source, a Path Computation Engine (PCE) needs to learn (either dynamically from the source or via static provisioning via PCE's northbound Application Programming Interface (API)) all destinations interested in receiving guaranteed bandwidth flows from the source and the bandwidth requirement for each such destination, compute a MP2P tree satisfying bandwidth requirements, allocate a single SID, and deploy the tree on appropriate nodes. With the proposed approach, the label space requirement is O(N) where N is the number of edge nodes. The proposed approach is based on MP2P forwarding entries, using a single MP2P tree to a destination from all sources wishing to send guaranteed bandwidth traffic to that destination. This single SID can be called a "MP2P SID" as the incoming and outgoing SIDs (where applicable) for the entire MP2P tree; of course, other names for this single SID are contemplated. The present disclosure also includes extensions to south bound protocols such as PCEP or Border Gateway Protocol—Traffic Engineering (BGP-TE) for the PCE to setup, maintain, and delete MP2P forwarding entries.

In various embodiments, the present disclosure includes a method having steps, a system such as a PCE including at least one processor and memory with instructions that, when executed, cause the at least one processor to implement the steps, and a non-transitory computer-readable medium having instructions stored thereon for programming at least one processor to perform the steps. The steps include determining a Multi-Point to Point (MP2P) tree from a plurality of source nodes to a destination node in a Segment Routing network, wherein the plurality of source nodes are sending traffic with guaranteed bandwidth requirements to the destination node, and wherein the MP2P tree is determined based on the guaranteed bandwidth; assigning a globally unique Segment Identifier (SID) for the MP2P tree; and causing programming of forwarding entries in the plurality of source nodes, any intermediate nodes, and the destination node, based on the MP2P tree.

The steps can further include receiving measurements from nodes on the MP2P tree of bandwidth utilized against the globally unique SID; and updating the MP2P tree if required based on the measurements. Each of the plurality of source nodes can utilize the globally unique SID to send guaranteed bandwidth to the destination node. The steps can further include receiving signaling from any of the plurality of source nodes for bandwidth reservation for the guaranteed bandwidth. The steps can further include, responsive to any changes in the plurality of source nodes and changes in the guaranteed bandwidth, updating the MP2P tree. The steps can further include determining a plurality of MP2P trees, one for each of a plurality of destination nodes requiring guaranteed bandwidth from corresponding source nodes. The globally unique SID can be for the destination node and a specific color that includes a specific policy. The globally unique SID can be managed by the processing device which is a Path Computation Engine (PCE), and wherein the globally unique SID is not flooded. The MP2P tree can be one of a plurality of MP2P trees for the destination node, each being used for any of bandwidth class and differentiated forwarding behavior.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a flowchart of a scalable, centralized SR-TE process.

DETAILED DESCRIPTION OF THE DISCLOSURE

Figure 1:
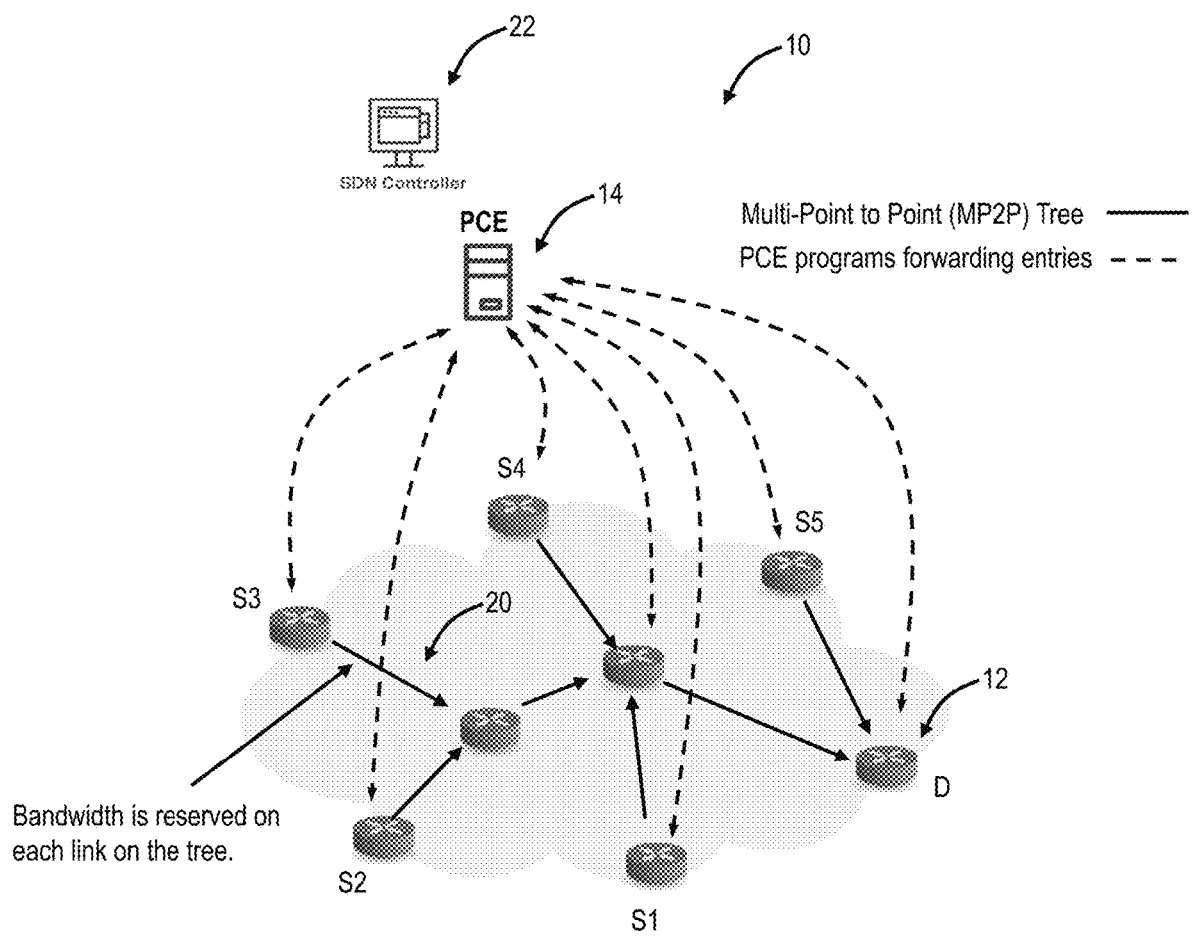
FIG. 1 is a network diagram of an example SR network with a plurality of nodes and a PCE.

Again, the present disclosure relates to systems and methods for a centralized approach to Segment Routing-Traffic Engineering (SR-TE) paths with bandwidth guarantee using a single Segment Identifier (SID). The present disclosure provides a centralized SR-TE solution with bandwidth guarantees without Maximum SID Depth (MSD) concerns at the source. For a given source, a Path Computation Engine (PCE) needs to learn (either dynamically from the source or via static provisioning via PCE's northbound Application Programming Interface (API)) all destinations interested in receiving guaranteed bandwidth flows from the source and the bandwidth requirement for each such destination, compute a MP2P tree satisfying bandwidth requirements, allocate a single SID, and deploy the tree on appropriate nodes. With the proposed approach, the label space requirement is O(N) where N is the number of edge nodes. The proposed approach is based on MP2P forwarding entries, using a single MP2P tree to a destination from all sources wishing to send guaranteed bandwidth traffic to that destination. This single SID can be called a "MP2P SID" as the incoming and outgoing SIDs (where applicable) for the entire MP2P tree; of course, other names for this single SID are contemplated. The present disclosure also includes extensions to south bound protocols such as PCEP or Border Gateway Protocol-Traffic Engineering (BGP-TE) for the PCE to setup, maintain, and delete MP2P forwarding entries.

Of note, in the description herein, we indicate multiple sources sending guaranteed bandwidth traffic to a given destination (and hence we need a MP2P tree), at some point in time, there may be a single source (in which case the path is P2P). As new sources are added, the path will become MP2P.

Segment Routing Overview

Segment Routing (SR) is a technology that implements a source routing paradigm. A packet header includes a stack of function identifiers, known as segments, which define an ordered list of functions to be applied to the packet. A segment can represent any instruction, topological, or service-based. A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. Segment Routing is described, e.g., in Fiflsfils et al., RFC 8402, "Segment Routing Architecture," Internet Engineering Task Force (IETF), July 2018, the contents of which are incorporated herein by reference. A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by a Software-Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, the document published in July 2015 as draft-previdi-6man-segment-routing-header (available online at tools.ietforg/html/draft-previdi-6man-segment-routing-header-08) and RFC 8754, "IPv6 Segment Routing Header (SRH)," March 2020, the contents of both are incorporated by reference herein. A segment is encoded as an IPv6 address. An ordered list of segments is encoded as an ordered list of IPv6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each Segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by ISIS or OSPF. The prefix segment steers the traffic along the shortest path to its destination. A node SID is a special type of prefix SID that identifies a specific node.

It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Engine (PCE) (e.g., when paths span across multiple IGP areas/levels).

Scalable, Centralized SR-TE

FIG. 1 is a network diagram of an example SR network 10 with a plurality of nodes 12 and a PCE 14. The nodes 12 can be routers, switches, or any other packet switching/forwarding device. The present disclosure includes a centralized (PCE-based, SDN-based) solution for SR-TE that enables operators to deploy an SR-TE solution with bandwidth reservations in a scalable manner. The solution is ideal for head-end platforms that cannot accommodate large SID stack. The proposed solution is applicable to both SR-MPLS as well as SRv6.

In particular, the present disclosure includes multiple multi-point to point (MP2P) trees 20, one for each destination of interest and color. An SDN controller 22 maintains a multi-point to point (MP2P) tree 20 for each destination of interest and color. Color in SR-TE represents a policy (e.g., low delay). The sources that want to send traffic to this destination are provisioned using the northbound interface of the SDN controller 22 along with their bandwidth reservation requests and color needs. Alternatively, it is possible for sources to signal the SDN controller 22 the amount of bandwidth to be reserved for each destination of interest using protocols such as PCEP. Reserved bandwidth may vary from source to source. The SDN controller 22 houses the PCE 14 which computes branches of this tree that has sufficient capacity as well as meets the policy intent of the color. Whenever sources are added, existing sources are deleted, and bandwidth reservations are updated, the PCE 14 updates this tree. The 14 PCE also updates the tree as network topology changes due to failures and repairs.

Of note, FIG. 1 illustrates an example MP2P tree 20 with various source nodes 12, labeled S1-S5, providing traffic to a destination node 12, labeled D. Those skilled in the art will appreciate there will be a different MP2P tree 20 for each destination as well as each color. In the example MP2P tree 20, any of the source nodes S1-S5 can send traffic to the destination node D via the MP2P tree 20.

To each MP2P tree and color, the PCE 14 can assign a globally unique SID that we call MP2P SID. It then programs the forwarding entries at source, mid-point, and destination nodes 12 (routers). The forwarding entry contains the destination D, the MP2P SID, and the color. In the case of SR-MPLS, MP2P SID may be derived from SRLB or SRGB or any other label block exclusively reserved for MP2P trees. In the case of SRv6 network programming, each MP2P tree can be associated with a unique network function. The crux of this approach is that regardless of the path constraints (color) and bandwidth required, a single SID is sufficient to forward packets along the tree 20 making this proposal attractive to access platforms capable of imposing small number of SID(s).

For a more dynamic bandwidth reservation scheme (similar to RSVP-TE auto-bandwidth feature), each node 12 on the MP2P tree 20 can measures bandwidth utilized against the MP2P SID and report it to the SDN controller 22 which then modifies the MP2P tree 20 in a make-before-break fashion. Also, mechanisms such as Telemetry or protocols such as BGP-LS, PCEP with additional extensions can be used to report link utilization.

The number of additional states maintained on nodes 12 will be proportional to the number of MP2P trees 20 which is proportional to the number of end nodes receiving guaranteed bandwidth traffic.

Differentiated services with different bandwidth guarantees are realized by deploying:

1) a dedicated MP2P tree for each bandwidth class.

2) a single MP2P tree with Class of Service (CoS) field such as experimental (EXP) bits of MPLS label to mark differentiated forwarding behavior within that tree.

Note that MP2P SIDs are allocated and managed by the PCE 14 and are not flooded in IGP or BGP-LS.

Scalable, Centralized SR-TE Process

FIG. 2 is a flowchart of a scalable, centralized SR-TE process 50. In various embodiments, the process 50 can be realized as a method having steps, a system including at least one processor and memory with instructions that, when executed, cause the at least one processor to implement the steps, and a non-transitory computer-readable medium having instructions stored thereon for programming at least one processor to perform the steps. For example, the process 50 can be implemented by the PCE 14.

The process 50 includes determining a Multi-Point to Point (MP2P) tree from a plurality of source nodes to a destination node in a Segment Routing network, wherein the plurality of source nodes are sending guaranteed bandwidth to the destination node, and wherein the MP2P tree is determined based on the guaranteed bandwidth (step 52); assigning a globally unique Segment Identifier (SID) for the MP2P tree (step 54); and causing programming of forwarding entries in the plurality of source nodes, any intermediate nodes, and the destination node, based on the MP2P tree (step 56). The process 50 can further include receiving measurements from nodes on the MP2P tree of bandwidth utilized against the globally unique SID (step 58); and updating the MP2P tree if required based on the measurements (step 60).

Each of the plurality of source nodes can utilize the globally unique SID to send guaranteed bandwidth to the destination node. The process 50 can further include receiving signaling from any of the plurality of source nodes for bandwidth reservation for the guaranteed bandwidth. The process 50 can further include, responsive to any changes in the plurality of source nodes and changes in the guaranteed bandwidth, updating the MP2P tree. The process 50 can further include determining a plurality of MP2P trees, one for each of a plurality of destination nodes requiring guaranteed bandwidth from corresponding source nodes.

The globally unique SID can be for the destination and a specific color that includes a specific policy. The globally unique SID can be managed by the processing device which is a Path Computation Engine (PCE), and wherein the globally unique SID is not flooded via IGP. The MP2P tree can be one of a plurality of MP2P trees for the destination, each being used for any of bandwidth class and differentiated forwarding behavior.

Example Node

Figure 3:
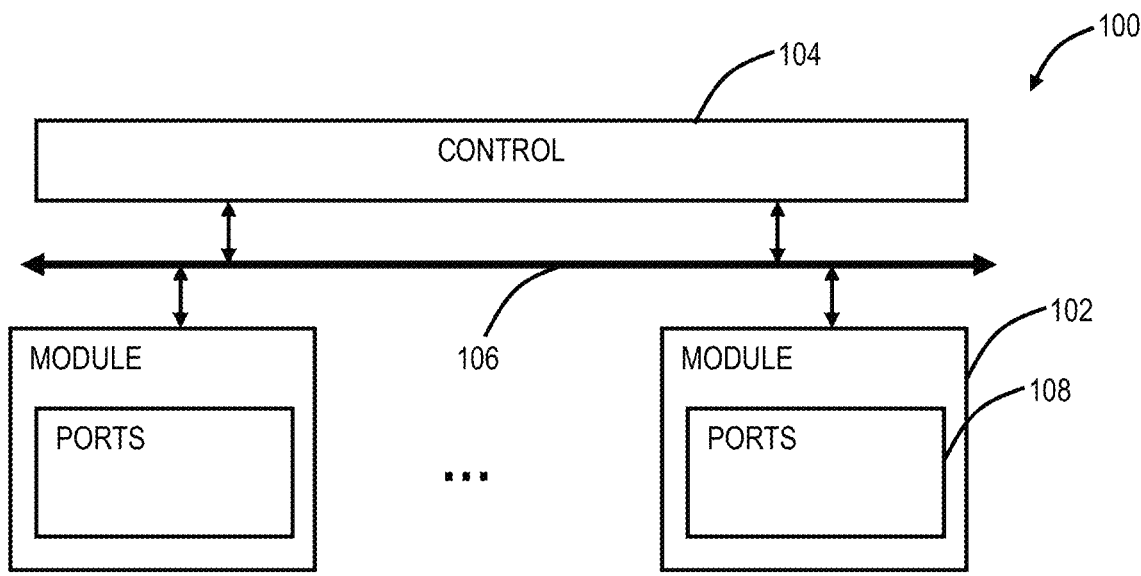
FIG. 3 is a block diagram of an example implementation of a node, such as for the node in the example SR network of FIG. 1.

FIG. 3 is a block diagram of an example implementation of a node 100, such as for the node 12 in the network 10. Those of ordinary skill in the art will recognize FIG. 3 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, the PCE 14, the SDN controller 22, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 3 is meant to provide a functional view, and those of ordinary skill in the art will recognize actual hardware implementations may vary.

Example Controller

Figure 4:
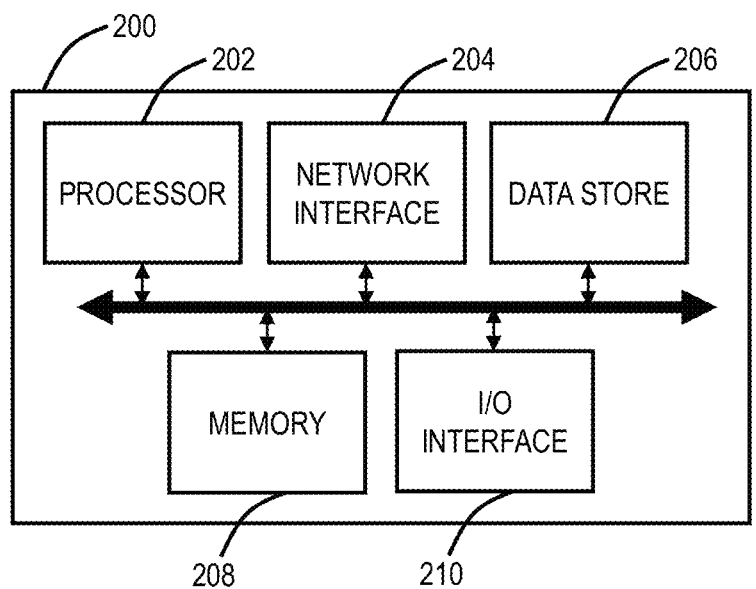
FIG. 4 is a block diagram of an example processing device.

FIG. 4 is a block diagram of an example processing device 200, which can form a control module for the node 12, the PCE 14, the SDN controller 22, etc. The processing device 200 can be part of the node 12, or a stand-alone device communicatively coupled to the node 100. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes 12, the PCE 14, the SDN controller 22, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium having instructions stored thereon for programming a processing device to perform steps of:
    determining a Multi-Point to Point (MP2P) tree from a plurality of source nodes to a destination node in a Segment Routing network, wherein the plurality of source nodes are sending traffic with guaranteed bandwidth requirements to the destination node, and wherein the MP2P tree is determined based on the guaranteed bandwidth;
    assigning a globally unique Segment Identifier (SID) which is a single SID representing the MP2P tree; and
    causing programming of forwarding entries using the globally unique SID in one or more of the plurality of source nodes, any intermediate nodes, and the destination node, based on the MP2P tree.

2. The non-transitory computer-readable medium of claim 1, wherein the steps further include
    receiving measurements from nodes on the MP2P tree of bandwidth utilized against the globally unique SID; and
    updating the MP2P tree if required based on the measurements.

3. The non-transitory computer-readable medium of claim 1, wherein each of the plurality of source nodes utilize the globally unique SID to send guaranteed bandwidth traffic to the destination node.

4. The non-transitory computer-readable medium of claim 1, wherein the steps further include
    receiving signaling from any of the plurality of source nodes for bandwidth reservation for the guaranteed bandwidth.

5. The non-transitory computer-readable medium of claim 1, wherein the steps further include
    responsive to any changes in the plurality of source nodes and changes in the guaranteed bandwidth, updating the MP2P tree.

6. The non-transitory computer-readable medium of claim 1, wherein the steps further include
    determining a plurality of MP2P trees, one for each of a plurality of destination nodes requiring guaranteed bandwidth from corresponding source nodes.

7. The non-transitory computer-readable medium of claim 1, wherein the globally unique SID is for the destination node and a specific color that includes a specific policy.

8. The non-transitory computer-readable medium of claim 1, wherein the globally unique SID is managed by the processing device which is a Path Computation Engine (PCE), and wherein the globally unique SID is not flooded via Interior Gateway Protocol (IGP).

9. The non-transitory computer-readable medium of claim 1, wherein the MP2P tree is one of a plurality of MP2P trees for the destination node, each being used for any of bandwidth class and differentiated forwarding behavior.

10. A method comprising steps of:
    determining a Multi-Point to Point (MP2P) tree from a plurality of source nodes to a destination node in a Segment Routing network, wherein the plurality of source nodes are sending traffic with guaranteed bandwidth requirements to the destination node, and wherein the MP2P tree is determined based on the guaranteed bandwidth;
    assigning a globally unique Segment Identifier (SID) which is a single SID representing the MP2P tree; and causing programming of forwarding entries using the globally unique SID in one or more of the plurality of source nodes, any intermediate nodes, and the destination node, based on the MP2P tree.

11. The method of claim 10, wherein the steps further include
receiving measurements from nodes on the MP2P tree of bandwidth utilized against the globally unique SID; and
updating the MP2P tree if required based on the measurements.

12. The method of claim 10, wherein each of the plurality of source nodes utilize the globally unique SID to send guaranteed bandwidth to the destination node.

13. The method of claim 10, wherein the steps further include
receiving signaling from any of the plurality of source nodes for bandwidth reservation for the guaranteed bandwidth.

14. The method of claim 10, wherein the steps further include
responsive to any changes in the plurality of source nodes and changes in the guaranteed bandwidth, updating the MP2P tree.

15. The method of claim 10, wherein the steps further include
determining a plurality of MP2P trees, one for each of a plurality of destination nodes requiring guaranteed bandwidth from corresponding source nodes.

16. The method of claim 10, wherein the globally unique SID is for the destination node and a specific color that includes a specific policy.

17. The method of claim 10, wherein the globally unique SID is managed by a Path Computation Engine (PCE), and wherein the globally unique SID is not flooded.

18. The method of claim 10, wherein the MP2P tree is one of a plurality of MP2P trees for the destination node, each being used for any of bandwidth class and differentiated forwarding behavior.

19. A Path Computation Engine (PCE) comprising:
at least one processor and memory comprising instructions that, when executed, cause the at least one processor to
determine a Multi-Point to Point (MP2P) tree from a plurality of source nodes to a destination node in a Segment Routing network, wherein the plurality of source nodes are sending traffic with guaranteed bandwidth requirements to the destination node, and wherein the MP2P tree is determined based on the guaranteed bandwidth,
assign a globally unique Segment Identifier (SID) which is a single SID representing the MP2P tree, and
cause programming of forwarding entries using the globally unique SID in one or more of the plurality of source nodes, any intermediate nodes, and the destination node, based on the MP2P tree.

20. The PCE of claim 19, wherein the instructions that, when executed, further cause the at least one processor to
receive measurements from nodes on the MP2P tree of bandwidth utilized against the globally unique SID, and
update the MP2P tree if required based on the measurements.

* * * * *